(12) United States Patent
Shaffer

(10) Patent No.: US 7,982,662 B2
(45) Date of Patent: Jul. 19, 2011

(54) SCANNING ARRAY FOR OBSTACLE DETECTION AND COLLISION AVOIDANCE

(75) Inventor: James Shaffer, Boise, ID (US)

(73) Assignee: Intellex, LLC, Eagle, ID (US)

( * ) Notice: Subject to any disclaimer, the term of this patent is extended or adjusted under 35 U.S.C. 154(b) by 29 days.

(21) Appl. No.: 12/633,652

(22) Filed: Dec. 8, 2009

(65) Prior Publication Data

US 2011/0006943 A1    Jan. 13, 2011

Related U.S. Application Data

(60) Provisional application No. 61/120,780, filed on Dec. 8, 2008, provisional application No. 61/201,826, filed on Dec. 16, 2008.

(51) Int. Cl.
*G01S 7/02* (2006.01)
*G01S 7/48* (2006.01)
*G01S 13/00* (2006.01)
*G01S 17/00* (2006.01)

(52) U.S. Cl. ........ 342/158; 702/127; 702/155; 702/158; 702/159; 342/27; 342/52; 342/53; 342/54; 342/59; 342/70; 342/73; 342/74; 342/118; 342/146; 342/147; 342/368; 244/3.1; 701/300; 701/301; 356/3; 356/4.01; 356/5.01; 250/200; 250/201.1; 250/203.1; 250/203.2

(58) Field of Classification Search .............. 342/27–32, 342/70–75, 118, 146, 147, 158, 175, 195, 342/368–377, 52–56, 450–465, 78, 89–92, 342/149, 154, 176, 177, 192, 350, 361, 385, 342/417, 422–427, 59; 701/300, 301; 244/3.1–3.3; 343/700 R, 753, 754; 367/87, 99, 103; 359/196.1, 359/197.1, 212.1, 212.2, 220.1, 503; 250/200, 250/201.1, 203.1, 203.3, 203.7, 330, 332, 250/336.1, 338.1, 340, 342, 203.2; 356/27, 356/28, 28.5, 138, 140, 141.1, 450, 451, 356/454, 459, 460, 3, 4.01–5.15; 702/127, 702/155, 158, 159

See application file for complete search history.

(56) References Cited

U.S. PATENT DOCUMENTS

| | | | | |
|---|---|---|---|---|
| 2,470,939 A | * | 5/1949 | Miller et al. | 342/177 |
| 2,907,024 A | * | 9/1959 | McGillem | 342/154 |
| 2,925,594 A | * | 2/1960 | Garrett | 342/158 |
| 2,946,051 A | * | 7/1960 | Cooper et al. | 342/158 |
| 2,946,893 A | * | 7/1960 | Baum | 250/203.7 |
| 2,953,962 A | * | 9/1960 | Argyle | 359/503 |
| 2,961,656 A | * | 11/1960 | Gipe | 342/361 |
| 3,025,515 A | * | 3/1962 | Fairbanks | 342/53 |

(Continued)

*Primary Examiner* — Bernarr E Gregory
(74) *Attorney, Agent, or Firm* — Your Intellectual Property Matters, LLC; Robert A. Frohwerk

(57) ABSTRACT

This scanning array scans an area around the array for nearby objects, collision obstructions, and terrain topography. The scanning array can scan for sounds emitted by objects in the vicinity of the scanning array, passive energy receipt sources, or it can also send out an energy beam and scan for reflections from objects within the energy beam. The energy beam can be optical, laser, radar or other energy emitting sources. The scanning array of the invention can be used for helicopter detection and avoidance of collision risk and can be used for other scanning purposes. Scanning of an entire hemisphere or greater is accomplished by manipulating the scanner platform through the coordination of either linear actuators or gimbals so as to produce nutation without rotation. This motion allows transceivers to be directly coupled to transmitting and sensing modules without the losses associated with slip rings and other coupling devices.

22 Claims, 11 Drawing Sheets

U.S. PATENT DOCUMENTS

| | | | |
|---|---|---|---|
| 3,064,897 A * | 11/1962 | Bailey et al. | 342/458 |
| 3,071,036 A * | 1/1963 | McKnight et al. | 359/220.1 |
| 3,153,787 A * | 10/1964 | Williams | 342/350 |
| 3,194,511 A * | 7/1965 | Cohen | 244/3.17 |
| 3,386,786 A * | 6/1968 | Kaisler et al. | 359/220.1 |
| 3,597,620 A * | 8/1971 | Wellman | 250/203.1 |
| 3,618,090 A * | 11/1971 | Garrison | 343/754 |
| 3,699,324 A * | 10/1972 | Iliff et al. | 342/426 |
| 3,733,603 A * | 5/1973 | Johnston | 342/192 |
| 3,859,658 A * | 1/1975 | Rabow | 342/425 |
| 3,883,876 A * | 5/1975 | Roeder et al. | 342/425 |
| 3,886,555 A * | 5/1975 | Royal | 342/425 |
| 3,912,198 A * | 10/1975 | Dell et al. | 244/3.16 |
| 3,912,859 A * | 10/1975 | Christopherson | 244/3.16 |
| 3,947,847 A * | 3/1976 | Felsenthal, Jr. | 342/78 |
| 3,954,228 A * | 5/1976 | Davis, Jr. | 244/3.16 |
| 3,964,053 A * | 6/1976 | Heiser | 244/3.13 |
| 3,974,383 A * | 8/1976 | Chapman | 250/342 |
| 3,976,999 A * | 8/1976 | Moore et al. | 342/90 |
| 3,983,474 A * | 9/1976 | Kuipers | 342/424 |
| 3,999,182 A * | 12/1976 | Moeller et al. | 342/372 |
| 4,006,356 A * | 2/1977 | Johnson et al. | 244/3.16 |
| 4,014,020 A * | 3/1977 | Barrett et al. | 342/92 |
| 4,061,415 A * | 12/1977 | Taenzer | 359/212.2 |
| 4,065,771 A * | 12/1977 | Gulick et al. | 342/368 |
| 4,107,530 A * | 8/1978 | Brumfield et al. | 250/342 |
| 4,173,762 A * | 11/1979 | Thompson et al. | 342/425 |
| 4,202,515 A * | 5/1980 | Maxwell, Jr. | 244/3.11 |
| 4,227,077 A * | 10/1980 | Hopson et al. | 244/3.16 |
| 4,717,822 A * | 1/1988 | Byren | 244/3.16 |
| 4,743,114 A * | 5/1988 | Crane, Jr. | 356/454 |
| 4,790,493 A * | 12/1988 | Schwarzkopf et al. | 244/3.21 |
| 4,802,767 A * | 2/1989 | Jasper | 356/460 |
| 4,806,761 A * | 2/1989 | Carson et al. | 250/332 |
| 5,072,890 A * | 12/1991 | Klaus et al. | 244/3.16 |
| 5,127,604 A * | 7/1992 | Klaus, Jr. | 244/3.16 |
| 5,344,099 A * | 9/1994 | Pittman et al. | 244/3.13 |
| 5,664,741 A * | 9/1997 | Duke | 244/3.11 |
| 6,535,158 B2 * | 3/2003 | Wilkerson et al. | 342/158 |
| 6,542,227 B2 * | 4/2003 | Jamieson et al. | 356/28.5 |
| 6,650,407 B2 * | 11/2003 | Jamieson et al. | 356/141.1 |
| 6,665,063 B2 * | 12/2003 | Jamieson et al. | 356/141.1 |
| 7,450,068 B2 * | 11/2008 | Chen et al. | 342/427 |
| 2002/0035444 A1 * | 3/2002 | Wilkerson et al. | 702/159 |
| 2008/0117105 A1 * | 5/2008 | Chen et al. | 342/427 |

* cited by examiner

SCANNING ARRAY FOR OBSTACLE DETECTION AND COLLISION AVOIDANCE

PRIORITY/CROSS-REFERENCE TO RELATED APPLICATIONS

This application claims the priority date of two provisional application entitled Articulating Platform for Mounting and Aiming Multiple Transmitters, Receivers and or Transceivers of Light and Other Energy Media filed on Dec. 8, 2008 with application Ser. No. 61/120,780, and of application Ser. No. 61/201,826 filed Dec. 16, 2008, both of which disclosures are incorporated here by reference.

BACKGROUND OF THE INVENTION

The invention generally relates to an apparatus for scanning a hemisphere in space, and more particularly to an apparatus for using an energy beam and reflected energy receivers to scan a hemisphere in space to detect obstacles to the flight of a helicopter, aircraft, or other vehicle.

The problem of scanning an area for objects at night or in bad weather has long been a problem for all kinds of vehicles. For instance, a helicopter striking obstacles such as wires has been a problem throughout the history of helicopters. Other obstacles can include pylons, radio masts, guy wires, transmission wires, antennas, and cables, and are very serious problems, since many helicopter missions involve flying at low altitudes, or landing in makeshift landing zones. The strategy of military helicopters is to use the terrain to mask the helicopter from radar or visual detection, and as protection against missile countermeasures. In these missions the crew avoids obstacles by use of visual observation during the daytime and by night vision goggles and thermal imaging systems at nighttime. Deliberately flying low in this manner increases the danger and the need for an obstacle avoidance system such as the invention.

Rotorcraft has the highest accident rate per 100,000 hours of operation of all commercial and military aircraft operated in the US and other countries. Most helicopter crashes occur during landing, often in inclement weather. Because of their vertical takeoff, landing, and hovering capabilities, rotorcraft can operate in a variety of unique and challenging environments not faced by fixed wing aircraft. Pilots often face operational situations where they are unfamiliar with the terrain and environment, and/or operate in inclement weather where visibility is significantly reduced. Combine these issues with above ground electrical wires and power poles, or similar obstacles, and the result can be a main rotor or tail rotor collision with the obstacle.

Several systems have been introduced, such as laser, electromagnetic field detection and radar, but size, weight, area in view, and obstacle size of detection continues to be a challenge for safe operations within these types of environments/conditions. The development and implementation of a cost effective, lightweight, small obstacle detection system with audible and visual warnings when hazards are being approached, within a nearly complete hemisphere of protection, could greatly reduce collisions for rotorcraft in reduced speed operation and landing situations.

Power transmission lines, cables and wires, which represent the smallest and hardest to distinguish obstacles, are not detectable by conventional radar due to their small size, yet such cables and wire are strong enough to cause a crash of the helicopter. What is needed is a detection system capable of detecting such cables below and around a helicopter, aircraft, or vehicle.

Other needs exist for a scanning array and for scanning using a variety of energy sources, for a number of different purposes. Energy sources can include sound, various forms of laser, radar, microwaves, and other energy types. Such a scanning array would emit energy in beams and include sensors to receive reflected energy. Such an array would be useful to detect collision dangers to helicopters, other aircraft, as well as ground vehicles, and submarines, with the capability of getting each of these vehicle types through physical hazards as well as through rain, dust, and fog.

SUMMARY OF THE INVENTION

These and other goals are achieved by the scanning array of the invention. The scanning array of the invention is a device which may be mounted on a vehicle such as a helicopter, an airplane, or a ground vehicle such as a tank, mobile artillery piece, humvee or armored personal personnel carrier. The scanning array is a device which sends out a beam in a generally hemispherical shape. As the energy beam encounters objects within its range, a part of the energy is reflected back to the scanning array, is received by sensors, is interpreted by a computational device and information about the topography or nearby obstacles is presented to the operator of the vehicle. In the case of a helicopter, one piece of data which is of primary importance is a scan to detect collision obstacles, such as wires, power lines, transmission lines, fences, trees, or other objects which may be difficult for the pilot to see in darkness or bad weather. In the case of other vehicles, such as aircraft or ground based vehicles, similar obstacle detection is advantageous and may inform a tank driver of nearby topography or obstacles, with similar information being useful for an aircraft pilot as well. The scanning array of the invention emits an energy beam, which may take a number of forms. The energy beam can be acoustic, with the scanning array providing an effect similar to sonar. The energy beam can also be a laser, of which there are many different types that are possibilities. The energy beam of the invention may also be radar, microwaves, or other forms of energy, which would be tailored to the specific application and the object to be detected.

The device includes a base unit which is configured for attachment to the signal source. The signal source being the vehicle to which the scanning array is mounted. The base unit provides a housing and a structure for enclosing and protecting and for attachment of other components of the system. One embodiment of this device is an after-market add-on to a vehicle, with the base unit containing and supporting all the components of the system to make the device work.

The device includes a platform to which are attached one or more sensors and/or energy beam projection units. The energy beam projection units can project any of the types of energy noted above. The platform on which the energy projection units are attached is configured to nutate without rotation. The nutation of the platform results in a motion similar to a coin being spun on its side. One side of the platform goes up while the opposite side goes down, and this can occur very rapidly. This articulation of the platform has the effect of a spinning or rotating platform, but the platform is articulating and nutating without rotating.

The device also includes at least one reflected energy receiver mounted on the platform for receiving and detecting energy that is reflected back from the nearby object. The energy projection unit can be combined with the reflected energy receiver in the form of a transceiver.

The scanning array is also applicable to any scanning situation, such as a submarine scanning for sound emanating from other submarines, or reflected off surfaces from SONAR. For instance when dealing with sensing for sources of sound, either reflected or nonreflected, the device would utilize sensors such as transceivers. The device can also utilize a combination of sensors and sending units, with the sensors capable of sensing reflected energy. The energy can be of a variety of types, including sound, RADAR of various types, SONAR, microwave, infrared, and other types of energy.

One embodiment of the scanning array of the invention is a device which sends out a beam in a scan pattern selected from a number of possible scan patterns. One scan pattern is generally hemispherical in shape, but other scan patterns, such as raster scans, paintbrush scans, sector scans, or others may be employed. The device can include the capability of using a sequence of scan patterns to find and then monitor more closely a source of sound or reflected energy. For instance, the device can use a general detection scan pattern as a default scan. When an object or source of sound is encountered it can then switch to a scan which scans the area of the object more frequently, in order to more accurately determine the position and distance of the object. This type of scan could be called a targeting or sector scan. In the source case of detecting sound, the path of a bullet or the source of a bullet could be detected in a general detection scan. A targeting scan could then focus on the area of the source of the sound, and could detect the subsequent sounds of the shooter, such as a bullet casing hitting the ground, the rifle bolt returning, the shooter breathing, or changing position.

In the case of a solid object being detected, as the energy beam encounters objects within its range, a part of the energy is reflected back to the scanning array, is received by sensors, is interoperated by a computational device, and information about the topography of nearby obstacles is presented to the operator of the vehicle. In the case of the helicopter, one piece of data which is of primary importance is a scan to detect collision obstacles, such as wires, power lines, transmission lines, fences, trees, or other objects which may be difficult for the pilot to see in darkness, bad weather or heavy dust conditions. In the case of other vehicles such as aircraft or ground based vehicles, or surface ships or submarines, similar obstacle detection is advantageous and may inform a pilot or driver of nearby topography or obstacles, with similar information being useful for an aircraft pilot as well. The scanning array of the invention emits an energy beam which may take a number of forms. The energy beam can be acoustic, with the scanning array providing an effect similar to sonar. The energy beam can also be a laser of which there are many different types. The energy beam of the invention may also be radar, microwaves, or other forms of energy, which would be tailored to the specific application and the object to be detected.

The device includes an array housing which in several embodiments is configured for attachment to the signal source, the signal source being provided by the vehicle or building to which the scanning array is mounted, or the position of a building mounted, or a stand-alone scanning array. The array housing provides a housing and a structure for enclosing, protecting, and for attachment of other components of the system. One embodiment of this device is an aftermarket add-on to the vehicle, with the array housing containing and supporting all of the components of the system to make the device work.

The device includes a platform to which are attached one or more sensors and/or energy beam projection units. The energy beam projection units can project any of the types of energy noted above. The platform on which the energy beam projection units are attached is configured to nutate without rotation. The nutation of the platform results in a motion similar to a coin being spun on its side. One side of the platform goes up while the opposite side goes down, and this can occur very rapidly. This articulation of the platform has the effect of a spinning or rotating platform, but the platform is articulating and nutating without rotating. Thus it has the scanning advantages of rotation, but since it is not rotating it may be hard-wired with electrical and optical cables.

This simulated, but not rotating platform with multiple sensor capability, allows hard wiring of any onboard sensors, emitters and receivers, and results in the most efficient transfer and receipt of energy information in a scanning platform. This is a direct transfer of energy transmission and receipt, without any line losses caused by the typical slip rings or mercury switches. Defined as Signal to Noise Ratio, or SNR, the ability to hard-wire the platform emitters and sensors, removing slip rings and mercury switches, immediately results in a 2× increase in SNR.

The device provides a hemispherical and super-hemispherical capability through nutational movement of the scanning platform. Nutation is defined as: "The periodic oscillation that can be observed in the precession of the earth's axis and the precession of the equinoxes". In the conventional or generic dictionary definition above, the Earth or another heavenly body and or its axis is said to be nutating such that a trace of the travel of the axis of the Earth e.g., would describe a conical pair with respect to a plane also containing the sun, which in turn would invoke the existence of a point at the vertex of the conical pair, essentially lying on the same aforementioned plane. This point therefore, may be referred to as the point of nutation, a term prevalent herein. As in the case of most heavenly bodies, the Earth is also rotating about its axis. Were that rotation of such a body completely withdrawn, it could be rationally stated that the axis and its body were still in a state of nutation, although day and night would be substantially fixed. By way of definition of the word nutation, aAs it is applied in this document, nutation it may refer to either nutation without rotation or nutation with rotation where such nutation is a mechanically productive possibility. To further describe the definition, the possibility of variability of the conical angle must be considered in this document. If this variability were imposed on the earth in a progressive manner, starting from a conic angle of zero, the equinoxes would have the polar areas become progressively warmer in summer and the equator progressively cooler. Nutation considered with the possibility of variation in the conic angle can provide motion in a machine that is highly productive and is subject in certain forms of this invention.

This A common embodiment of the device also includes at least one reflected energy receiver mounted on the platform for receiving and detecting energy that is reflected back by a nearby object. The energy projection unit can be combined with the reflected energy receiver in the form of a transceiver.

One embodiment of the device is a scanning array which makes up a collision avoidance system, termed the Obstacle Warning and Landing System (OWLSys), and applies an advanced electromechanical positioning system, mounted on the exterior of an aircraft, coupled with next generation LADAR capability to provide 360 degree horizontal detection coverage around the aircraft, and roughly 215 degree vertical coverage from ground to rotor blade tip, hemispherical to super-hemispherical coverage below the vehicle. The device of the invention provides a minimum obstacle detection size capability (⅜" Diameter) which exceeds the capability of existing forward looking, larger obstacle avoidance systems, such as the Laser Obstacle Avoidance Monitoring System (LOAM), and provides more complete coverage by both area and volume with better obstacle size detection and at a fraction of the cost. For reduced speed and landing operations, the scanning array of the invention has the potential to reduce rotorcraft collisions with a variety of hazardous objects during landings and low-speed movement in the vicinity of confined spaces, such as power lines, trees, and other urban/vegetation hazards, and under inclement and poor visibility conditions such as dust storms.

This An embodiment of the invention employs a mechanism that has flexible and multiple LASER scanning applications. It includes a scanning array and platform which nutates, but which is a non-recessionary/non-precessionary nutation. This scanning array allows complete automation of scanner output with greater mechanical simplicity. By non-recession and non-precession what is meant is that the scanning array of the invention does not rotate either backward or forward, yet it produces a scanning effect similar to rotation. Because the scanning array of the invention does not rotate, the energy transmitters and sensors of the invention can be hard-wired electrically and optically to the energy source, such as a laser, and not have the signal to noise problems that a rotating scanning platform presents due to the use of slip rings and other mechanics that allow rotation.

The uniquely beneficial result of this technology is that the scanning array can infinitely maneuver any beam within 360 degrees of azimuth by approximately 215 degrees of elevation, without the constant winding or unwinding of wires or the use of slip rings or switches that would cause loss of signal-to-noise ratio. This mechanical arrangement significantly decreases equipment wear, weight of the package, increases signal-to-noise ratio, and improves efficiency of the scan. Development of this mobile hard-wired platform concept, including fiber optic cabling, is unique in the light-scanning world.

Although useful in all scanning situations, passive and active, one embodiment of the invention is primarily designed for landing and low-speed operations, differing from LOAM in that aspect, and hence, could be considered a complementary technology to LOAM. LOAM is one the conventional technology used in collision avoidance systems but designed as a forward looking and higher speed operation detector.

In one embodiment of the invention, the scanning array is mounted to a platform, and the platform is articulated to scan a hemispherical (half a sphere) or super-hemispherical scan (part of a sphere greater than a hemisphere). The scan will be referred to as hemispherical with the understanding that this term includes a scan which is a portion of a sphere greater than half a sphere. For instance, a scan using 0-180 degrees, and 0-220 degrees, etc. may be achieved based upon how the sensors are arranged. The platform on which the sensors are mounted can be moved in a nutating (non-rotational movement) by the use of as few as two linear actuators, or by using six linear actuators in a hexapod structure.

To achieve 180 to 220 degrees of hemispherical scan and super-hemispherical scan, the platform on which the sensors are mounted would tilt in a nutating fashion at from 0 to 45 degrees and 0 to 55 degrees respectively.

One embodiment includes sensors, typically transmitter and receivers combined into transceivers, on an articulating platform, with the transceivers strategically positioned on the platform, and the platform articulated by at least one of several methods, including a pair of linear actuators or a hexapod device such as a Stewart Platform capable of attaining six degrees of freedom and the necessary angles of articulation while maintaining a single point of articulation and any partial rotational component; and or a ring gimbal approach During this nutating movement of the platform, there is no rotation, thus regardless of the number of cycles the articulating platform is put through, the power and signal wires will not be "wound-up" and the convenience of such hard-wiring will reduce the complexity and eliminate any need for the use of slip-rings. If the transceivers are arrayed close enough, the simulated rotational capability of the platform shall need to be such that adjacent transceivers can supplant each others' views when segmentally rotated about the platform axis.

This An embodiment of the invention includes a nutation generator which is composed of a first gimbal ring and a second gimbal ring, with each of the gimbal rings mounted at two points along each ring, approximately 90° apart from each other and forming a first axis and a second axis. Each of the gimbal rings is moved in a rocking or up and down fashion by one or more gimbal motors attached at the mounting points of each gimbal ring. By combining the movements of each of the gimbal rings and with the platform attached to the gimbal rings, the sensors or transceivers on the platform can be moved to describe a scan pattern of various types. An overlapping conical, spiraling, or circular scan pattern is one of the scan patterns available. When four transceivers are used, four generally spiral scan patterns can be combined to form a scan which covers a hemisphere from the scanning array. The hemisphere can be a half of a circle or can be greater than half of a circle, with the word hemisphere meant to describe both the half circle and the greater than half circle or super-hemisphere.

The scanning array of the invention forms a hazard and obstacle detection system primarily developed to prevent power line strikes and collisions by a helicopter, that is able to scan for and detect all objects such as power lines and wires of ⅜ inch diameter, that have the potential of causing damage to a helicopter from any direction within 50 meters, day or night, and regardless of all but the most severe weather conditions. It is also capable of identifying objects such as power lines out to 100 meters with 100 meter visibility that could become hazards if the aircraft should move in that direction. Since power lines are of small diameters, but "infinitely" long to the scanning device, multiple detections along the length of the power line in a single scan are achieved. The scanning array of the invention forms a hazard and obstacle detection system similar to the "diamond openings" in a chain link fence, through the use of multiple types of scanning capabilities, in a hemispherical and or super-hemispherical scan.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
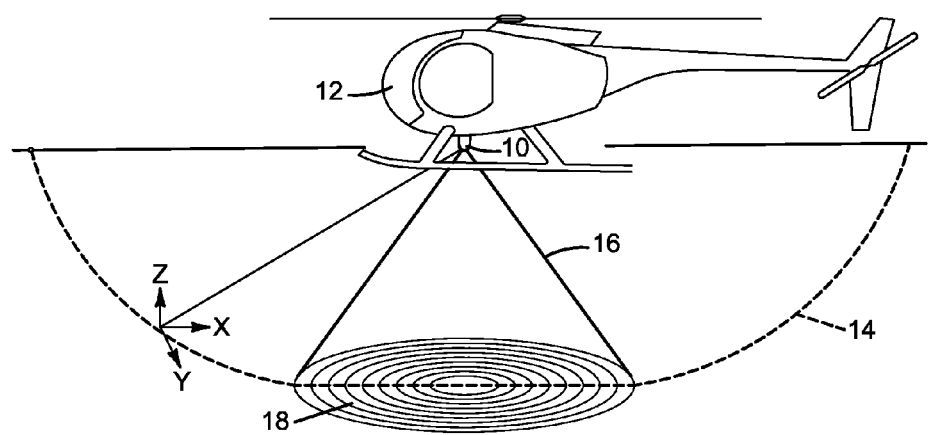
FIG. 1 is a side view with the scanning array of the invention mounted to the underside of the helicopter.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Several preferred embodiments of the scanning array of the invention are shown in FIGS. 1-18. FIG. 1 shows an example of the scanning array 10 of the invention, attached to a vehicle 12, which in this case is a helicopter. As noted above, the The scanning array can also be a stand alone unit, or attached to a building, or used with any number of different kinds of vehicles, such as helicopters, fixed wing aircraft, jeeps, tanks, trucks, and watercraft such as surface vehicles or submarines. While the example will be utilized of the device mounted to a helicopter, it is to be understood that the figures and description do not define the invention. The definition of the device is found in the claims and not in the description of any particular preferred or alternate embodiment of the device. Shown in FIG. 1 is a generally hemispherical scan pattern 14. One way to achieve the generally hemispherical scan pattern is through using a number of generally conical scan patterns 16, in which the sensors, energy beams, or transceivers of the device describe a generally spiraling scan pattern, such as identified at 18.

Figure 2:
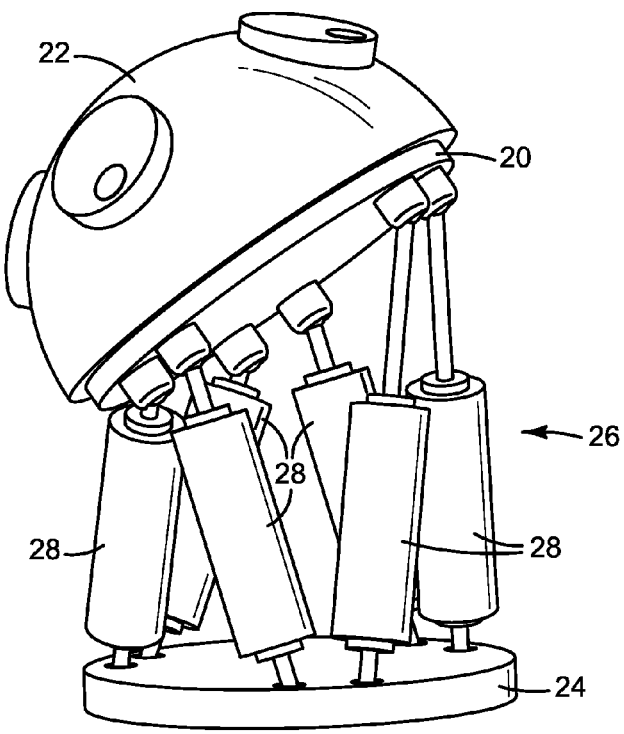
FIG. 2 is a perspective view of a hexapod version of the invention.
Figure 3:
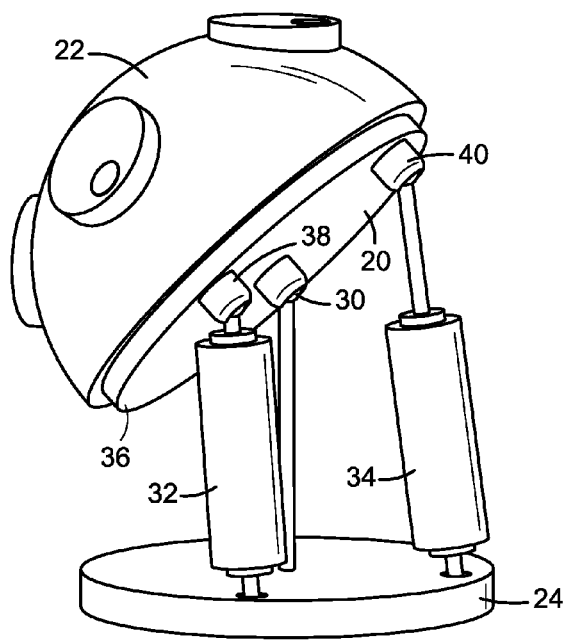
FIG. 3 is a perspective view of a version of the scanning array of the invention in which nutation is achieved by a pair of linear actuators operating about a central pivot point.

FIG. 1 also demonstrates a feature of the scanning array of the invention in which a general scan pattern, such as the hemispherical scan pattern 14, can be used to detect an object, and after detection of an object, the scanning array can switch to a more focused scan pattern such as the conical scan pattern 16, which serves as a targeting scan pattern. Other scan patterns are also possible using the scanning array of the invention. FIG. 2 shows one preferred embodiment of the invention, in which the scanning array is mounted on a platform 20 which is covered by a housing 22. This embodiment includes a base 24. All embodiments of the invention include a nutation generator 26. In the case of the embodiment shown in FIG. 2, the nutation generator is comprised of a number of linear actuators 28 which may also be called a hexapod when they exist in a configuration of six. The coordinated or rhythmic motion of the linear actuators 28 or of the hexapod cause the platform 20 to move in a direction that simulates rotation, but the platform does not rotate by this motion. This movement is called nutation and is similar to the motion of a coin which is spun on a flat surface and which spins with a nutating motion as it spins closer to the surface of a table. However, if such a coin is observed, it will be noted that any point along the edge of the coin is slowly moving in a rotating fashion. The platform 20 of the invention nutates but does not rotate. FIG. 3 shows an embodiment of the invention which utilizes the minimum number of linear actuators 28. In this version of the invention, a first and second linear actuator are utilized to impart nutating motion to the platform 20. These linear actuators are mounted approximately 90 degrees from each other on the periphery of the platform, and together can move the platform in a nutating fashion. The version shown in FIG. 3 includes a pivot support point 30. The version shown in FIG. 3 shows the first linear actuator 32 and the second linear actuator 34, attached to the base 24. The first linear actuator 32 attaches to the periphery 36 of the platform at a first periphery attachment point 38 and the second linear actuator 34 attaches to the periphery of the platform at a second periphery attachment point 40.

Figure 4:
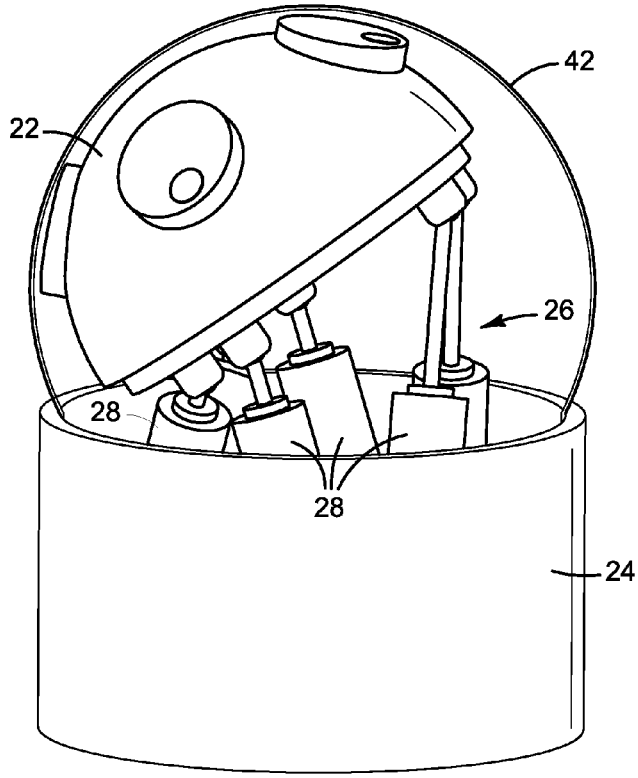
FIG. 4 is a perspective view of the scanning array of the invention in which the scanning array is enclosed in a protective housing with a clear cover.

FIG. 4 is a view of the scanning array of FIG. 2 or 3, which further includes a larger base unit 24, a housing 22, linear actuators 28, and a protective cover 42.

Figure 5:
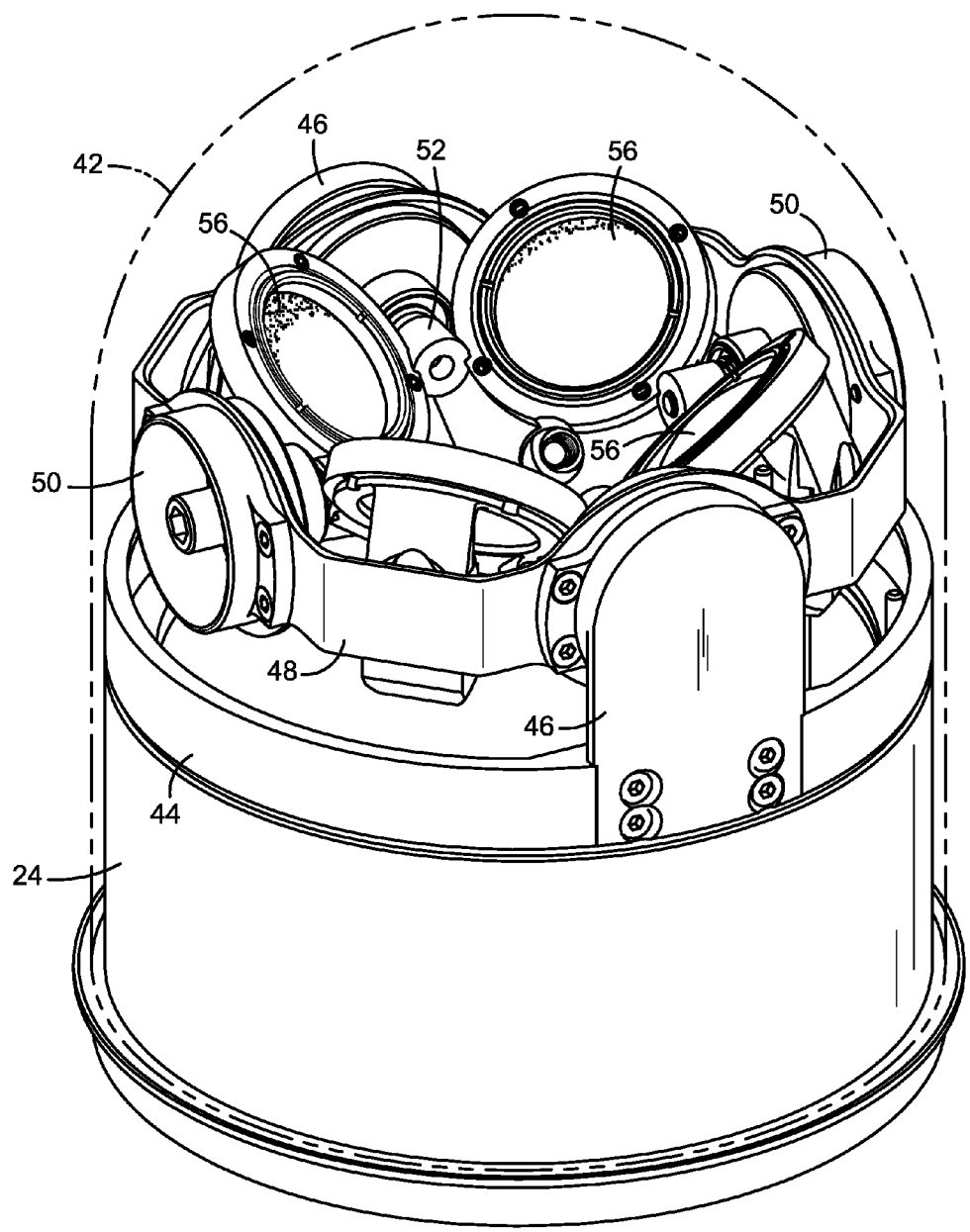
FIG. 5 is a perspective view of one embodiment of the scanning array of the invention.

FIG. 5 shows another preferred embodiment of the invention which includes a base 24, and a protective cover 42. Shown is a ring base 44, which includes two first gimbal ring mounting positions 46. Attached to the base ring 44 is a first gimbal ring 48, which includes two second gimbal ring mounting positions 50. Attached to the second gimbal ring mounting positions 50 is a second gimbal ring 52, which includes a platform on which are mounted, in this case, four transceivers 56.

Figure 6:
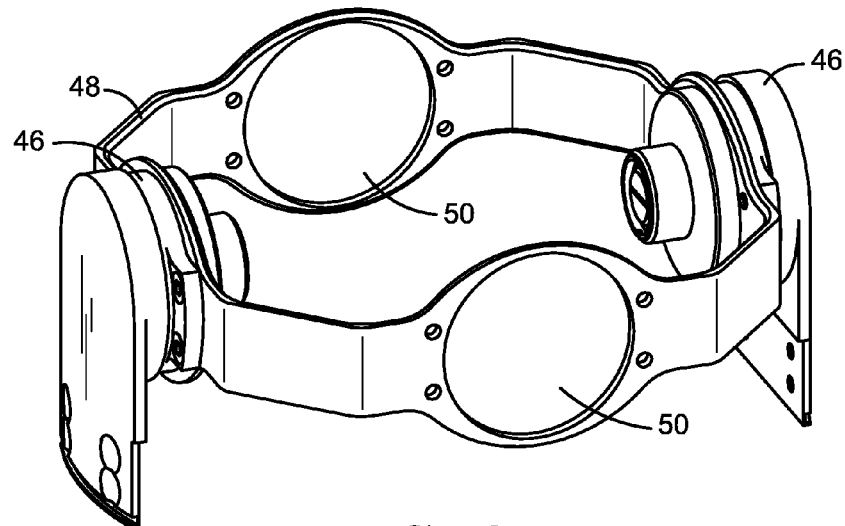
FIG. 6 is a perspective view of the first gimbal ring of the invention.

FIG. 6 shows the first gimbal ring 48, which includes the second gimbal ring mounting positions 50. The second gimbal is mounted in the second gimbal ring mounting positions 50. The first gimbal ring is mounted in the first gimbal ring mounting positions 46 which are attached to the ring base 44.

Figure 7:
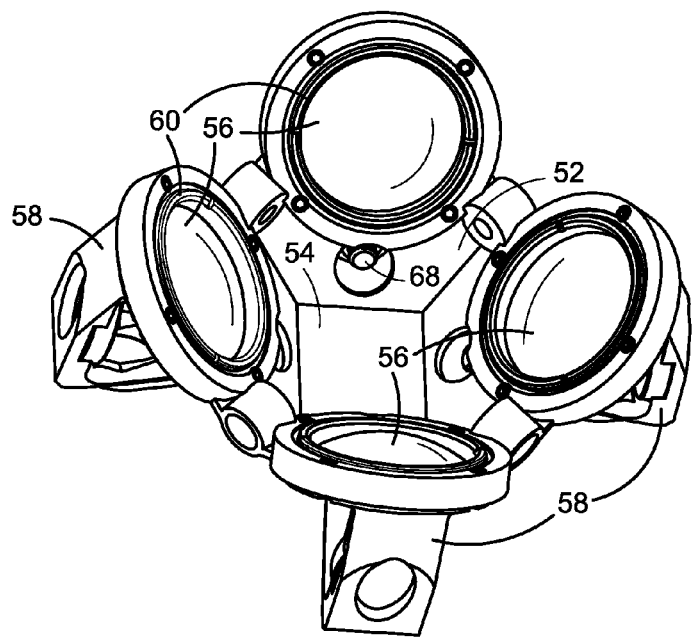
FIG. 7 is a perspective view of the second gimbal ring of the invention.

FIG. 7 shows the second gimbal ring 52 with its platform on which are mounted four transceivers 56.

Figure 8:
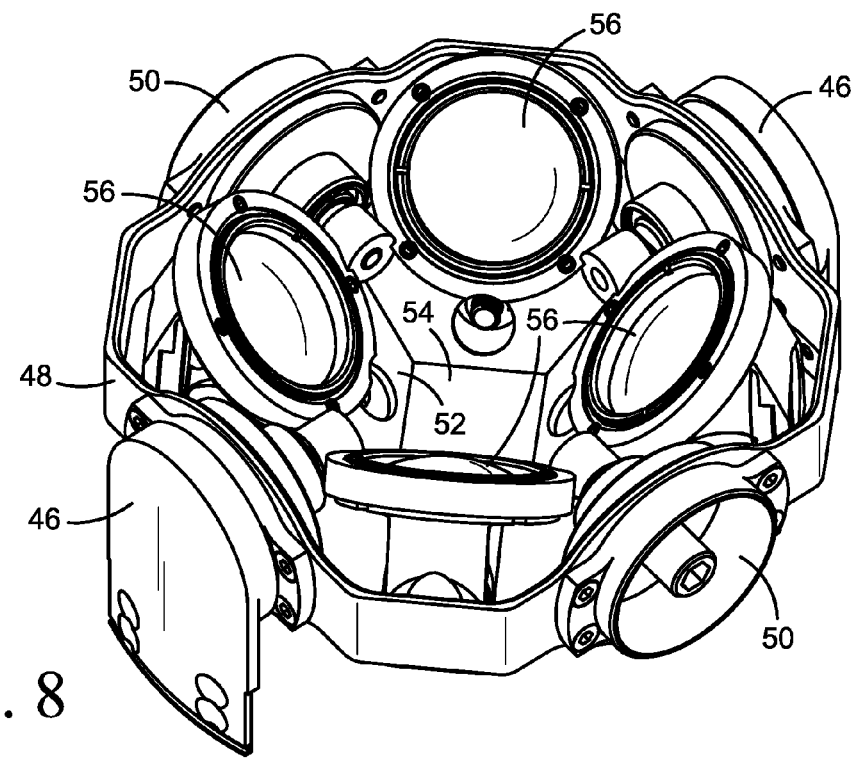
FIG. 8 is a perspective view of the combined first and second gimbal ring of the invention.

FIG. 8 shows the first gimbal ring 48 and the second gimbal ring 52 joined together.

Figure 9:
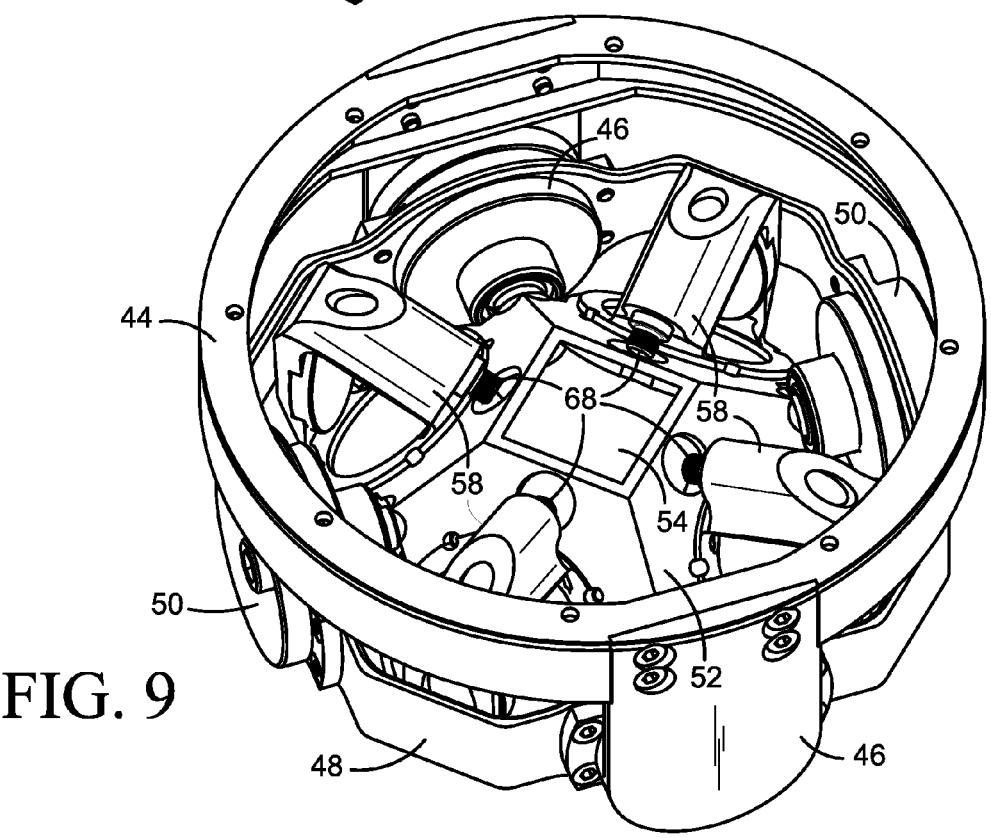
FIG. 9 is a perspective view of the underside of the assembly of FIG. 8.

FIG. 9 shows the underside of the assembly shown in FIG. 8. FIG. 9 shows the ring base 44, the second gimbal ring 52 to which are attached the transceivers 56. Cable access opening 54 provides for passage of cables through the second gimbal ring 52.

Figure 10:
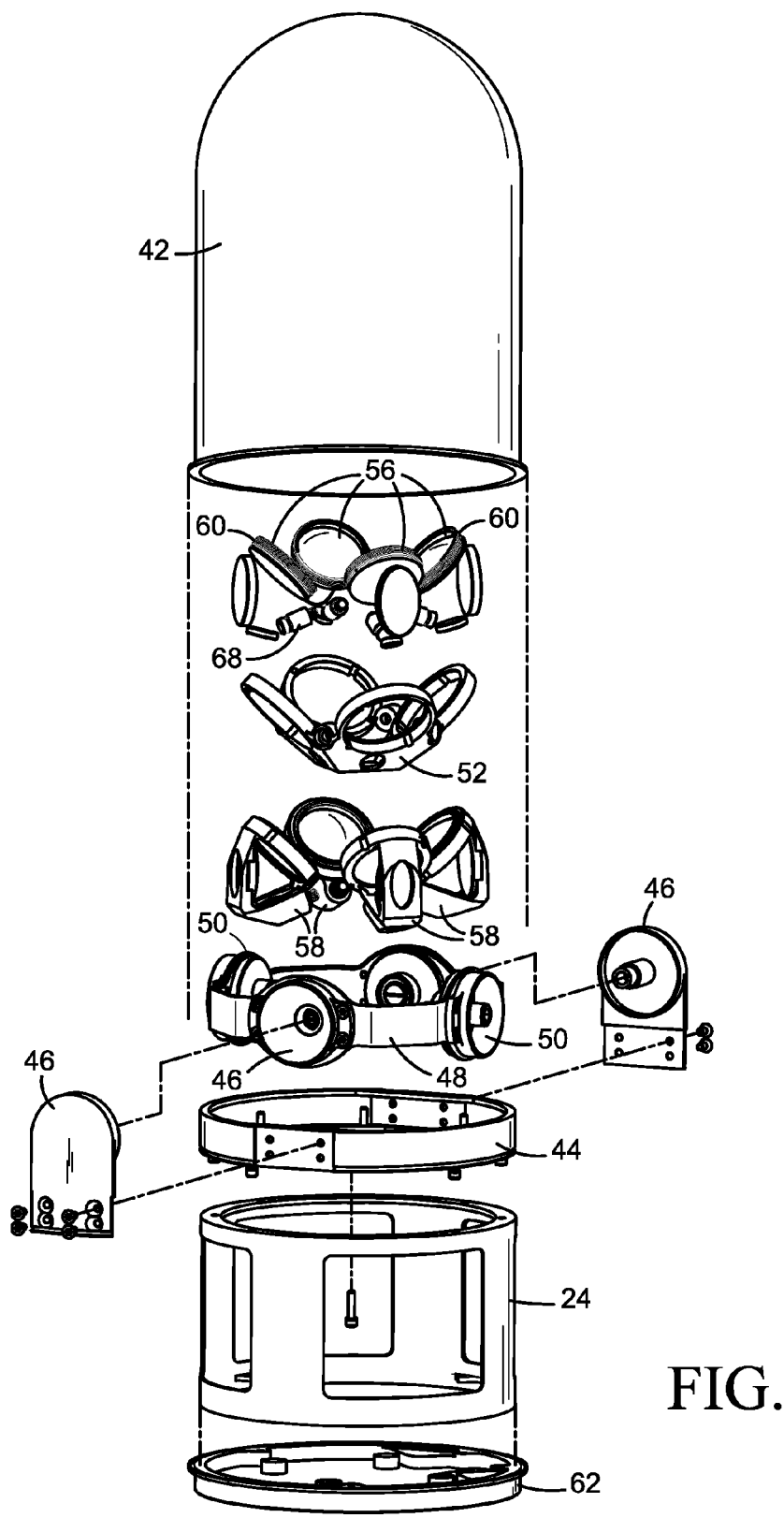
FIG. 10 is an exploded view of one embodiment of the scanning array of the invention.

FIG. 10 shows an exploded view of this embodiment of the scanning array of the invention. FIG. 10 shows the protective cover 42, the base 24, and the ring base 44, with the first gimbal ring mounting position 46. Also shown is the first gimbal ring 48. Attached to the first gimbal ring 48 is the second gimbal ring 52 to which are attached the transceivers 56, in transceiver housings 58, with the transceivers secured in the housings by closure rings 60. Also shown is an attachment base plate 62 for vehicle to embodiment installation.

Figure 11:
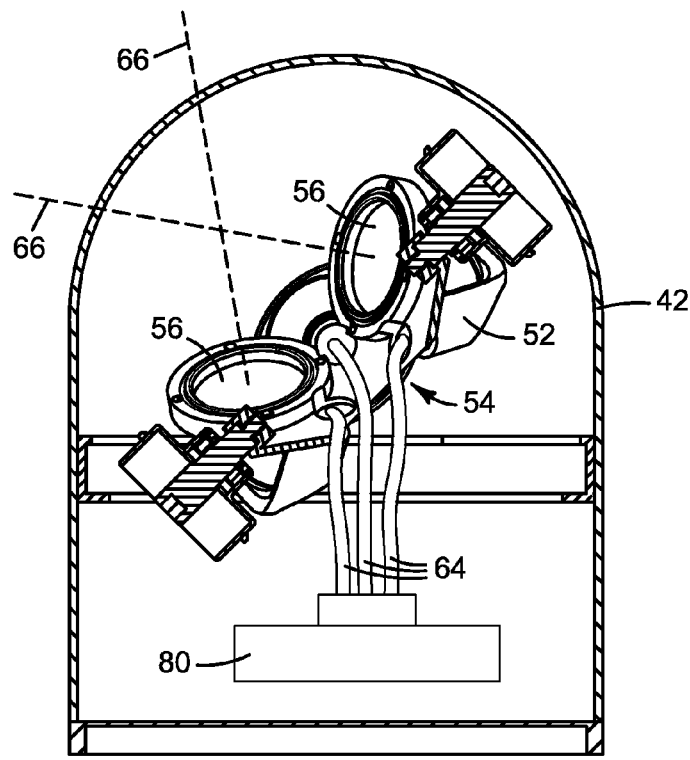
FIG. 11 shows a cross-sectional view of the scanning array of the invention showing one extreme of tilt of the scanning array.

FIG. 11 shows a cross-sectional view of this preferred embodiment of the invention rotated to its extreme position in one aspect. Shown are a protective housing 42, the second gimbal ring 52, a pair of transceivers 56 and a two-way optic cable 64. Shown emanating from the transceivers 56 are laser beams 66.

Although this embodiment is shown with laser beams 66, each of the transceivers 56 could be replaced by passive sensing units, such as transducers, for detecting incoming sound waves. Shown in this preferred embodiment are transceivers which include energy emitting devices as well as energy sensing devices. The two-way optic cable 64, as shown, connects to a Fiber Laser Assembly 80. For other energy emitting and/or sensing devices, assembly 80 is replaced by an appropriate control block.

Figure 12:
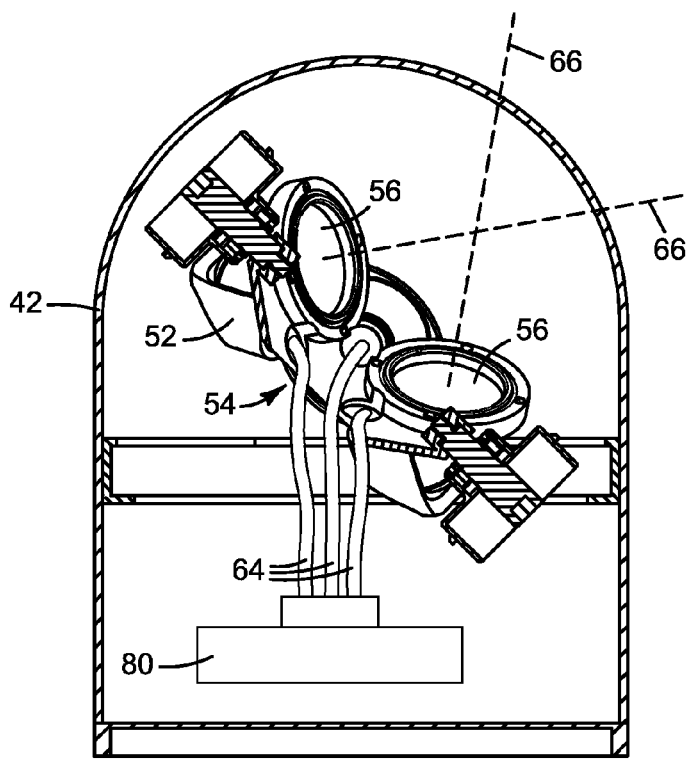
FIG. 12 is a cross-sectional view of the scanning array showing an extreme of tilt in the opposite direction as that shown in FIG. 11.

FIG. 12 shows a similar view as in FIG. 11, but with the second gimbal ring 52 rocked to the opposite extremity as that shown in FIG. 11. Otherwise, the two figures show the same components, such as the protective cover 42, the transceivers 56, and the laser beam 66. It is important to note that, although the coordinated movement of the first gimbal ring and the second gimbal ring results in motion of the transceivers in a scanning pattern, at no point do the transceivers or the platform they are on rotate. Instead, the motion is better described as nutation, which achieves the effect of rotation while allowing the electrical and optical connections such as the two-way fiber optic cable 64, to be hard-wired and not require the use of slip rings or other devices to accommodate rotation.

Figure 13:
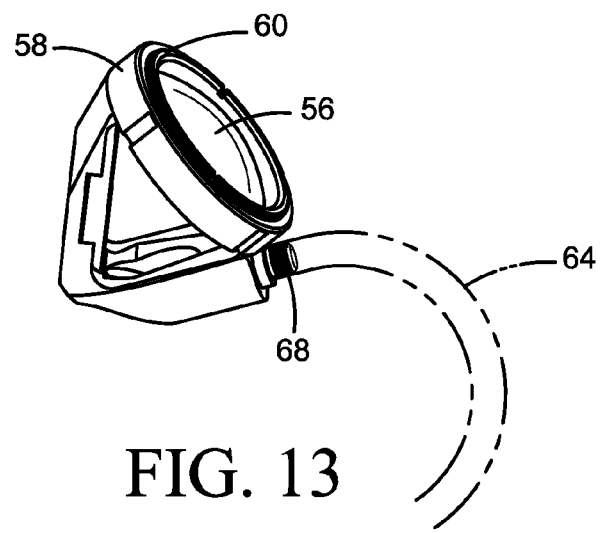
FIG. 13 is a perspective view of a transceiver of the invention.

Shown in FIG. 13 is a transceiver 56, including the closure ring 60. Shown is the optic cable connection port 68 through which two-way fiber optic cable 64 connects the transceiver 56 and the source of laser energy.

Figure 14:
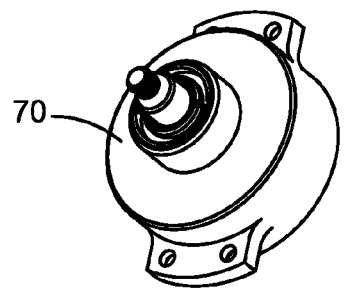
FIG. 14 is a perspective view of a gimbal motor of the invention.

Shown in FIG. 14 is a gimbal motor 70, which is mounted in the gimbal ring mounting positions (50, FIG. 6) and which is used to impart a rocking motion to both the first and the second gimbal rings. The coordination of the rocking motion of these two rings, and the degree and speed of rotation, controls and creates the scanning pattern which is selected for use at any one time.

Figure 15:
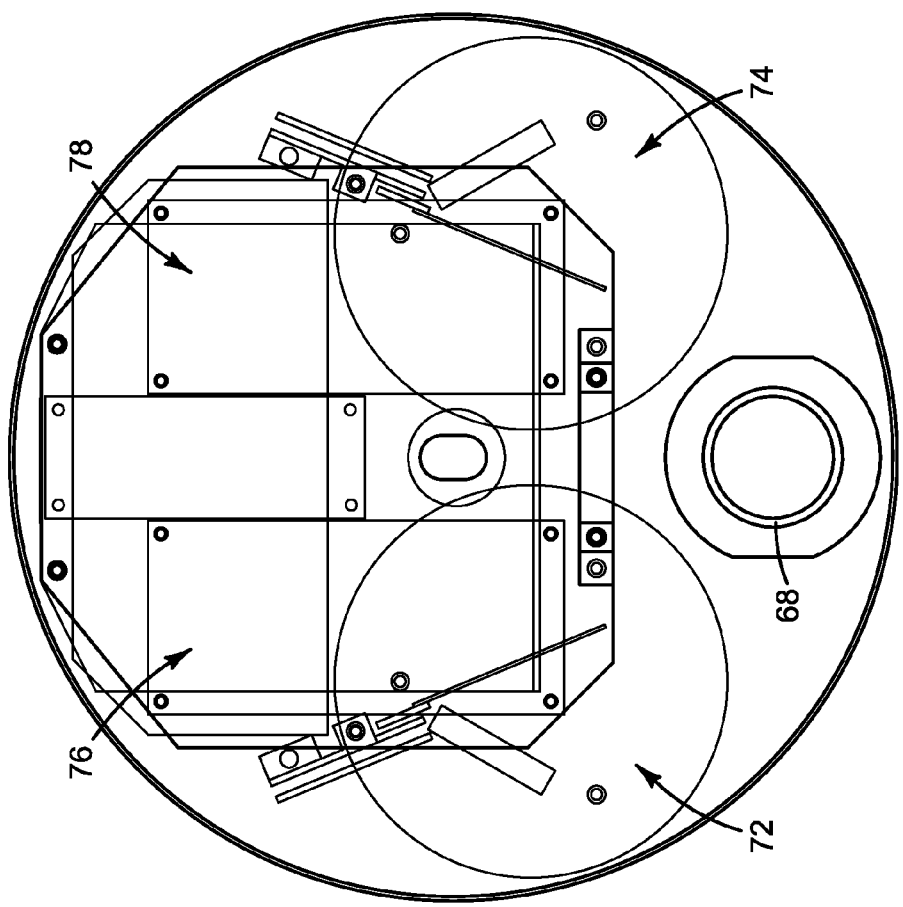
FIG. 15 is a top view of the laser and fiber optic components of the invention.

Shown in FIG. 15 is a top view of one preferred embodiment of the fiber optical and motor control circuitry of the invention showing a first fiber laser 72 and a second fiber laser 74. Also shown is a first motor driver 76 and a second motor driver 78. A first and second fiber laser (72 and 74) generate laser energy for transmission via connection port 68 over the two-way optic cable 64 and out to the transceiver (56, FIGS. 11-13).

Figure 16:
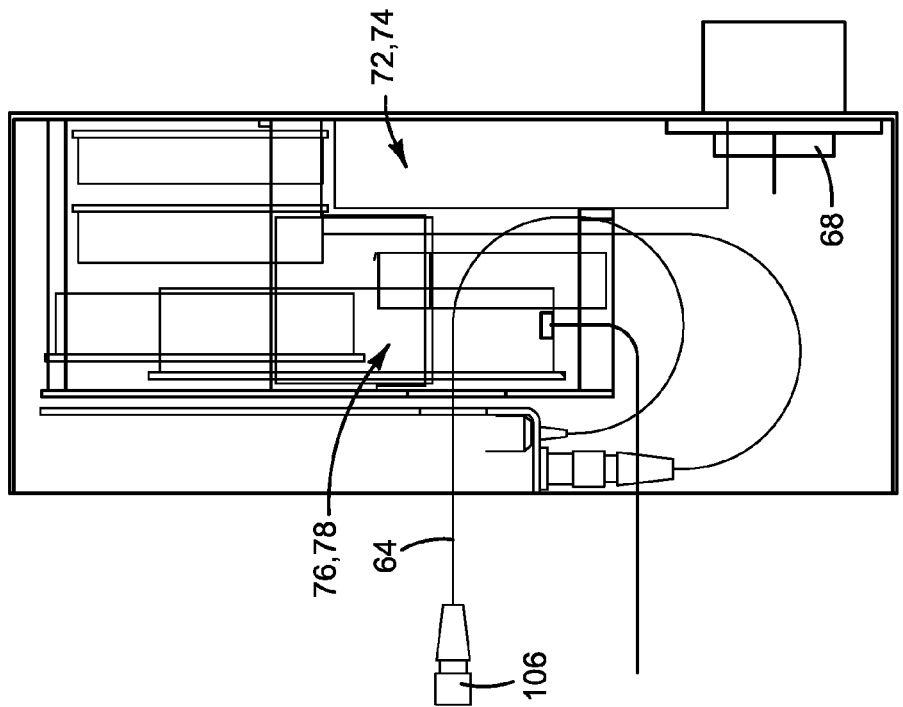
FIG. 16 is a side view of the laser and fiber optic components of the invention.

FIG. 16 is a side view of a preferred embodiment of the invention, and is a side view of the device shown in FIG. 15.

Figure 17:
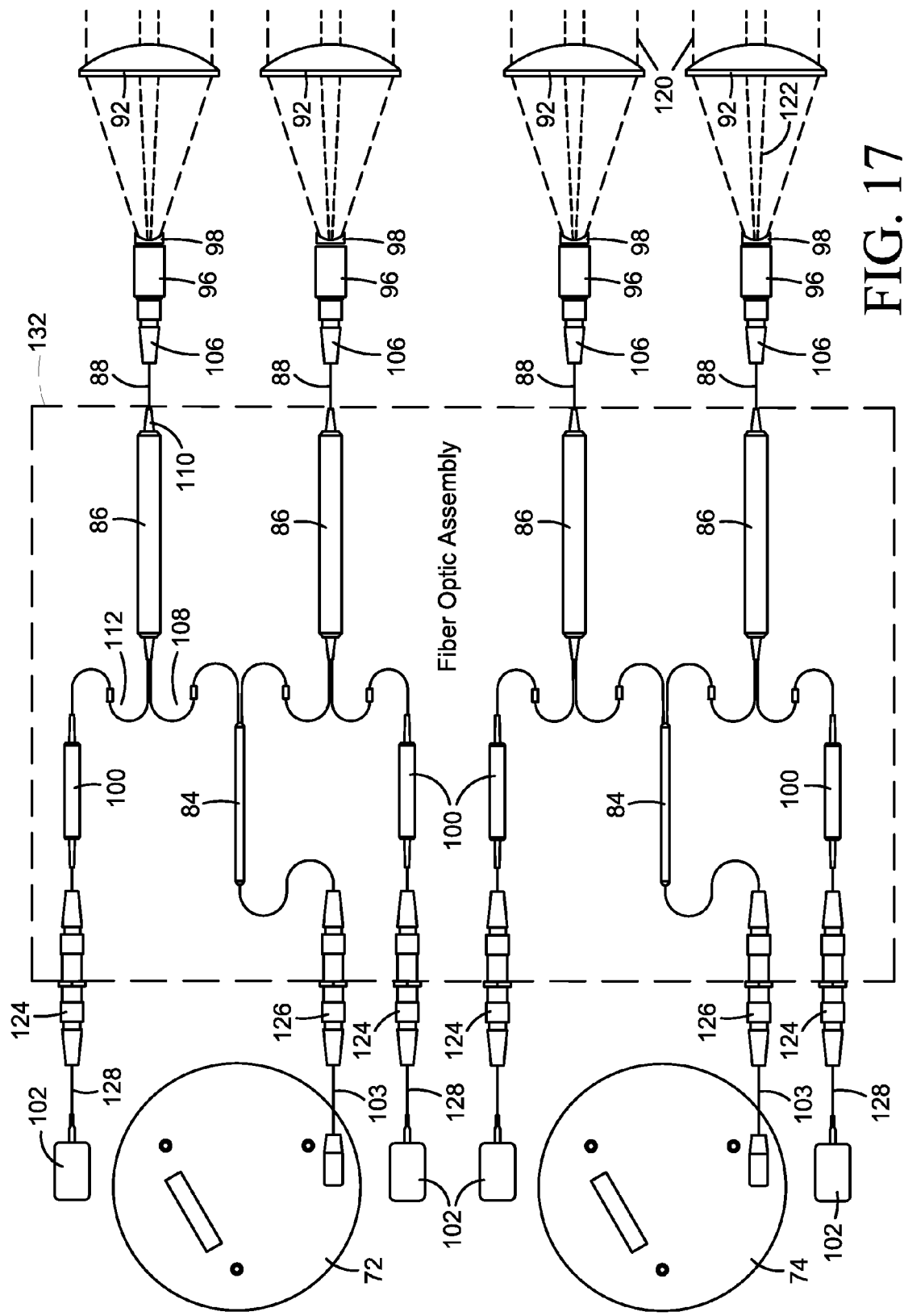
FIG. 17 is diagram showing the components of the fiber optic system and the transceivers.

FIG. 17 is a diagram of the optics system of the invention, showing the expansion scope 98, the fiber optic collimator 96, the connector 106, the port 1 (108), the port 2 (110), the port 3 (112), the fiber optic circulator 86, the transmission fibers (88, 128 and 130), the beam splitter 84, the fiber lasers 72 and 74, the transceiver lens 92, the band pass filter 100, and the photo detector/receiver 102. As shown, many of the optical components are included in Fiber Optic Assembly 132 which is a subassembly to the Fiber Laser Assembly 80 of FIGS. 11 and 12.

Figure 18:
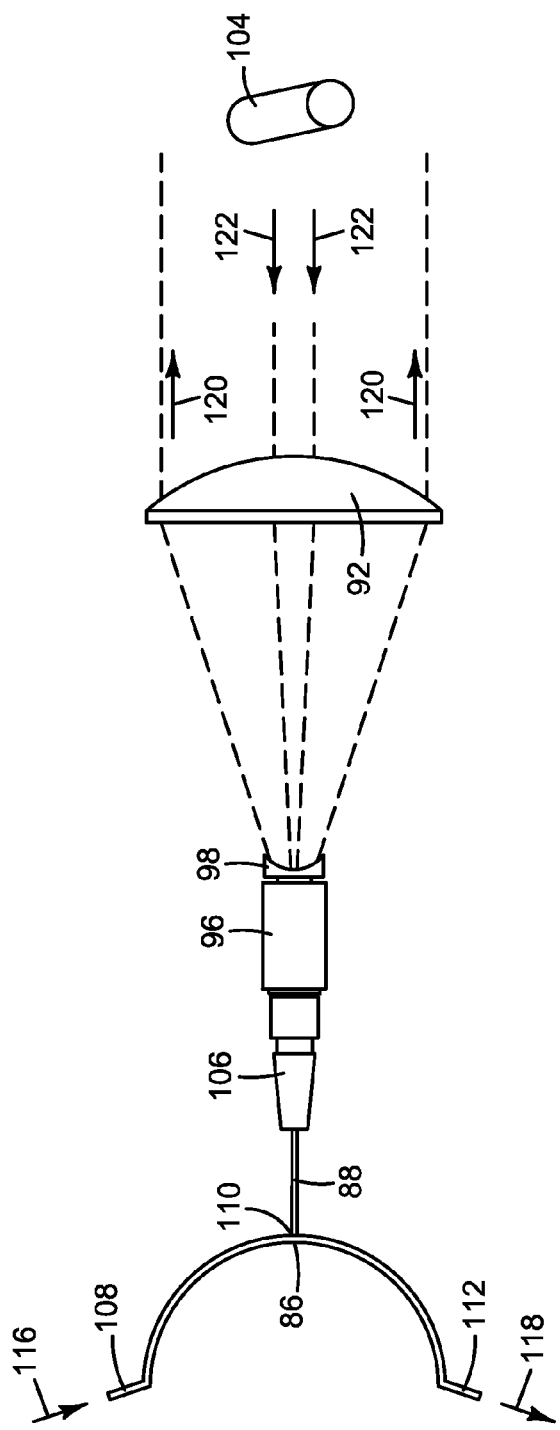
FIG. 18 is a diagram view of components of the fiber optic system of the invention.

FIG. 18 shows the optic circulator and collimator assembly. Shown in FIG. 18 are the target 104, the expansion scope 98, the fiber optic collimator 96, the connector 106, the port 1 (108), the port 2 (110), the port 3 (112), the fiber optic circulator 86, the high power pulse input 116, and the return reflection output 118. Fiber Optic Circulator 86 acts as a two-way path (transmit and then receive) for the laser light, while keeping the paths separated. It allows the high peak power transmitted pulse 116 to pass through from port 1 (108) to port 2 (110) and out to the Optical Collimator 96. The collimator 96 then takes the light from the fiber 88, expands and focuses it into a parallel beam 120, where the light is moving in one direction and does not expand. An Expansion Scope 98 further spreads out the beam while keeping it parallel in order to put a larger spot on a potential target 104.

This entire processes works in reverse for scattered Laser light 122 reflected back from a target 104. It re-enters the transceiver which now acts like a reduction scope and is focused into the collimator 96. The Collimator 96 couples the light back into the fiber 88 and then back into Port 2 (110) of the Circulator 86. The Circulator 86 is designed so that the return light coming back into port 2 takes a separate path through the Circulator and then comes out port 3 (112). The light from port 3 is then sent to the detector receiver unit 102 which converts it in to an electrical signal.

With the advancement within the military to use Unmanned Air Vehicles (UAVs), the scanning platform of the invention has the potential to provide improved platform "near-space" detection and control in a variety of scenarios where the mission incorporates UAVs with a rotorcraft controlling behind the scenes.

Laser range determination for helicopter hazard avoidance has certain advantages over Radar systems. Most lasers have finer resolution, they can detect smaller objects because of their much smaller beam size, and the transmitting and receiving scanning apparatus can be reduced from antennas to much smaller optics. The most significant disadvantage of conventional laser (LIDAR and LADAR) is the shorter wavelength of light and the associated power output density due to size constraints and existing laser diode technologies, as compared to radar, which makes it difficult to penetrate inclement weather such as sand, dust, smoke, rain, snow, and fog. Studies for optical wireless communications have shown that fog and heavy snow (due to the larger particle size of 2.5 to 10 microns) have the most attenuation to laser light. Atmospheric visibility is the measure of the attenuation of visible light over a given distance, and is normally expressed in decibels per kilometer (dB/km). One such study in fog, over a 100 meter distance with a 0.83 micron wavelength laser shows that, with a visibility of approximately 100 meters the attenuation was at times almost 20 dB, or reduced by 100 times.

A wavelength of 1.54 microns may be advantageously utilized in the device of the invention, because the laser pulse power can be significantly increased and still maintain an eye safe condition for personnel in the immediate vicinity. Comparison of laser beams at wavelengths of 0.83 and 1.55 microns showed no significant improvement in penetrating the fog even though 1.55 μm was a longer wave length. Target detection in poor visibility can be improved by (A) reducing beam width (more intense beam on the target) (B) increasing receiver collecting area (gather more of the return reflected light) (C) increasing receiver sensitivity and (D) increasing total transmitted power. For this application where multiple beams are used to scan separate quadrants for complete perimeter coverage, reducing beam width to a smaller spot size leaves bigger gaps between the spots and is not desirable. Larger receiving optics gather more return signal but increase the size and weight of the gimbals which must move at the fast scanning rate of up to 30,000 positions per second. Also, if the receiver sensitivity is increased, the backscatter from the laser beam off the fog could cause false targets to appear at the receiver. A significant increase in the laser transmitter pulse power is therefore the most productive way to get better penetration through heavy fog and other reduced visibility conditions for hazard detection. The transmitted power can be increased to the point just before it causes backscatter (false targets) off of even very dense fog.

Laser Diodes have been extensively used in past laser scanning designs because they can deliver a short duration pulse at reasonable peak powers (approx. 40 watts in a 3 or 4 diode stack), which is suitable for ranging with optical visibilities of 400 to 500 meters or grater greater. They are small, light weight, and low in cost, but have several shortcomings for this application. Laser Diodes have poor beam quality and require special astigmatic correction optics. Also when driven at the high peak currents needed (typically 80 amps or more) heat buildup generated in the junctions will limit the repetition rate at which they can be operated.

Short pulses of 5 to 6 nanoseconds duration with a fast rise time are needed in order to resolve range distances down to 2 meters or less. What is required then is a laser transmitter with high peak power, short pulse widths, and repetition rates of 20,000 or more pulses per second. Erbium doped fiber glass lasers can produce up to 11 kW peak power in a 5 nano nanosecond pulse in the 20-30 kHz repetition rates, at the 1.54 μm wavelength required. A big advantage of fiber lasers is the high beam quality which allows a simpler optical beam forming design of less components resulting in a more compact transmitter/receiver. Also, since the laser beam is coupled out through a fiber optic cable, the laser does not need to be mounted on the nutating platform, but can be placed under the platform and fiber coupled to the scanning optics. The receiver can be fiber coupled to the optics also and therefore no electrical connection to the nutating platform is required, eliminating bulky moving electrical cables and connectors. In order to achieve complete coverage around the helicopter and to get a reasonable repetitive (refresh rate) range on all hazards 2, 4, 6, or more individual scanning laser transmitter/receivers (transceivers) may be used, all operating at a minimum 20 kHz repetition rate. Such multiples of fiber lasers would otherwise be difficult, but the invention uses an innovative approach to apply a fiber laser design with the capability to split or divide the output beam into multiple equal beams with separate glass fibers routed to each beam forming optics. All transmitting beams are therefore capable of emitting simultaneously. Such beam splitters for this purpose are utilized.

This approach has several advantageous features, as an example 11 kW peak power divided 6 ways is about 1,800 watts with optical losses for each transmitter beam or about 40 times as much peak power as a diode laser can produce. Also by adding a fiber Optical Circulator to each of the transmission fibers a unique system is created where the transmitter and the receiver share the same fiber and optical system with several very significant advantages. Fiber circulators permit the transmitted pulse to travel from input port 1 to output port 2 and the return target reflection reentering at port 2 to exit port 3 with high isolation between. Only one beam expander lens assembly per transceiver is therefore required on the gimbal, reducing the size and complexity.

Also, in the current invention, the transmitted beam is expanded from 0.5 inch diameter to a 1.75 inch diameter. The bigger transmitted spot size gives better area coverage due to reduced gaps between adjacent spots, as well as the larger illuminated spot on a target like a power line will return more reflected light. Another advantage though is that at very close ranges like 30 meters, a system with separate side by side transmit and receive lenses do not need to utilize all of the illuminated target as the transmitted beam and the receiver field of view provide sufficient overlap.

With the receiver and the transmitter sharing a common lens (coaxial) the receiver always sees the entire illuminated target at all ranges. With a single fiber and with a simple one lens optical collimator, plus a two lens expansion scope with no alignment or focusing adjustments, this is all that is required for each transceiver optics. The additional power from the Fiber Laser will compensate for the loss of brightness (light intensity on the target) due to the increase in spot size, and add additional brightness to the output beam so that there will be fewer gaps in the coverage as well as a brighter signal intensity spot on targets like power lines to improve performance in poor visibility. Transmit and receive fiber paths only differ in that a bandpass filter 100 is required in the receiver path in order to reduce background noise from stray light sources in the target area. This can be accommodated by inserting a fiber bandpass filter between the exit port 3 of the fiber circulator and the fiber optic cabling to the receiver.

An InGaAs photodetector is required to be responsive to the 1.54 micron transmitter wavelength. To get the good sensitivity, fast response, and wide dynamic range needed to detect the short duration pulses with a large variation in amplitude, a PINFET receiver module was selected. It combines a PIN photodiode with a transimpedance amplifier. This receiver module comes with optical fiber input coupling, allowing any number of receiver modules to be placed on a common printed circuit board located beneath the scanning gimbals.

An approximation of the range performance for the proposed system for a typical hazard of a power line at 50 meter distance with only 50 meter visibility would be:

1,800 watts transmitted peak power less 2 dB fiber and optics loss equals about 1,200 watts out of the dome.

20 dB loss for attenuation to target=12 watts at target 10 dB loss for small target cross section=1.2 watts 10 dB loss for low reflectivity of target=0.12 watts 20 dB loss for poor reflected beam pattern (non flat target) =1.2 milliwatts 20 dB loss for attenuation back to receiver=12 micro watts The sensitivity of receiver and optics is about −40 dB equals approximately 0.1 micro watts.

The margin of detectability is then 120 times or about 20 dB.

The nutating platform of this embodiment has only the optics package which can be securely mounted to withstand the vibrations encountered. There is now a small single fiber going to each of multiple transceivers. The fiber will have a screw on FC/SMA type connector designed for high vibration environments. Fiber optic collimators will be used on the gimbals which incorporate the mating connectors.

The electronics section may include the fiber laser transmitter that is triggered by the a computer associated with the platform, 6 a PINFET receivers (depending on how many transceivers are used), 6 and range counters feeding for each transceiver to feed range data to the computer, a power supply which conditions the prime power from the helicopter, and the drivers for the actuators.

Digital range counters, rather than analog will be used so that ranges out to 1000 meters can be recorded. Low voltage LCX type logic is suitable for counting transitions of a 74.5 MHz clock which will give a 2 meter resolution. An accuracy of 2 meters is sufficient for this application because the location (or position) of a hazard is the primary function of this device and the distance information is only used to determine the danger level (or zone) of the hazard.

The scanning array of the invention provides the detection area of coverage out to 70-100 meters for an object size of 0.375 inches. For every degree in the Hemisphere, the platform must be moved ½ of degree. One embodiment of this invention is developed around a LADAR scanner but also has wide application in light and energy media processing and manipulation.

Pointing lines of sight LOS through articulation have allowed the light/energy media transmitted and received to be processed in a static environment. Thus seldom have the processing entities been located on the articulating equipment used for the pointing purpose. This invention achieves the transmission of a singular line of sight LOS to and from any point in a hemisphere. Note that in each case the only entity that is being articulated is the media symbolized by the line of sight. Therefore, there is no requirement for the media processing equipment to be articulated, but may be positioned on a stationary platform.

This approach, advanced herein, enables multiple lines of sight to be scanned. In some cases various methods of pointing an articulatable platform, mounting light/energy transmitters, receivers, and or transceivers, so as to cause lines of sight to travel either established paths or point at randomly selected fields of view, typically do so by generating electrical power on the mobile platform by mechanical means or via slip-ring connection with a static base. Such a platform is typically rotated continuously and thus cannot be hard-wired with electrical power or with a means of communicating data signals electronically or via fiber optic cable with a static base structure, without resorting to the complication and limitation of dragging wires or suffering the consequences of signal degradation through the use of slip rings.

Device Capabilities
    Based on Laser Rangefinder Technology
    Integrated System
    Single Scan unit (Multiples possible depending on mission requirements)
    Processes laser signals to determine presence and distance of obstacles
    Real Time processing identify obstacles within radii of detection
    Provides pilot alert information—Audible and Visual feedback system
    Hemisphere scan around/below the helicopter
    Look up" to Rotor
    System turns on at speeds less than 20 knots (Programmable)
    Audible message of OWLSys "on and off"
    Null Acquisition
Device Specifications
    Weight—Total 12.5 lbs
    Size—8" Diameter Externally Mounted Scanner
    Input voltage—28 Vdc
    Input current—6 Amps maximum When multiple emitters and/or sensors are used, they may be productively arrayed such that the LOS of each device will assist in forming a cone-like figure which can be combined with other emitters and/or sensors to create a hemispherical (including super-hemispherical) scan.

The present invention uses a nutating platform with minimal rotation. Mounted to the platform are strategically mounted transmitters, receivers and or transceivers to achieve a high quality, sufficiently dense and/or a custom scan of light/energy media. Such a platform will mount a series of light/energy transmitters, receivers, and or transceivers so arrayed as to scan at least a hemisphere and do so without rotation of the subject platform. As a result of no rotational movement, the sensors and transmitters may be hard-wired to a static entity such that both data signals and electric power may be directly communicated to or from both the static base and articulating mobile platform without signal degradation. There may be occasion to require the mobile platform to operate at rather difficult angles to achieve super hemispheric scanning.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A scanning array, comprising:
an array housing;
a platform attached to said array housing, said platform comprising a nutation generator configured to direct nutation of said platform without rotation; and
at least one sensor attached to said platform,
wherein by nutation of said platform said at least one sensor traces a scan pattern,
and wherein said at least one sensor is adapted to detect energy from objects within said scan pattern for determination of a position of each detected object.

2. The scanning array of claim 1, in which said nutation generator comprises at least a first linear actuator and a second linear actuator and a spacing pivot support,
wherein said platform is connected to said array housing and held spaced apart by said spacing pivot support, and
wherein a first end of said first linear actuator is mounted to said array housing and a second end of said first linear actuator is mounted to a first periphery attachment point of said platform, and
wherein a first end of said second linear actuator is mounted to said array housing and a second end of said second linear actuator is mounted to a second periphery attachment point of said platform, and
wherein said first periphery attachment point and said second periphery attachment point and an attached end of the spacing pivot support form an approximate isosceles right triangle having a vertex at the attached end of the spacing pivot support, and
wherein said first linear actuator and said second linear actuator are configured to contract and extend in coordinated movement to cause nutation of said platform without rotation.

3. The scanning array of claim 1 in which said nutation generator further comprises three or more linear actuators with said platform connected to said array housing and held in a spaced apart position by said linear actuators,
wherein each of said linear actuators are mounted at a first end to said array housing and at a second end to a periphery attachment point on a periphery of said platform, and wherein said linear actuators are configured to contract and extend in coordinated movement to cause nutation of said platform without rotation.

4. The scanning array of claim 1 in which said at least one sensor comprises a sound receiver to detect sound from an object detected in said scan pattern.

5. The scanning array of claim 1 which further comprises one or more energy transmitting units attached to said platform, with said energy transmitting units configured to send an energy beam to objects in said scan pattern for detection, by said at least one sensor of energy reflected from said objects in said scan pattern.

6. The scanning array of claim 5 in which said at least one sensor and said one or more energy transmitting units are combined into one or more transceivers attached to said platform, with said one or more transceivers connected by fiber optic cable to an energy generator and to a reflected energy interpreter for calculation of a direction and distance to each object detected.

7. The scanning array of claim 6 which further comprises four or more transceivers attached to said platform and configured to trace one or more scan patterns by sending an energy beam and detecting reflected energy.

8. The scanning array of claim 1, further comprising at least one energy transmitting unit mounted to said platform,
wherein said nutation generator further comprises:
a first gimbal ring rotatably attached at two points to said array housing and configured to rotate around a first axis;
a second gimbal ring rotatably mounted to said first gimbal ring and configured to rotate around a second axis orthogonal to said first axis; and
said platform attached to said second gimbal ring, and
wherein control of said first gimbal ring in coordination with said second gimbal ring causes said platform to nutate without rotation, and
wherein said energy transmitting unit projects a beam to each location traced by said scan pattern.

9. The scanning array of claim 8 in which said at least one sensor comprises a sound receiver to detect sound from an object encountered in said scan pattern.

10. The scanning array of claim 8 wherein said energy transmitting unit is configured to send an energy beam in said scan pattern for detection, by said at least one sensor of energy reflected from objects in said scan pattern.

11. The scanning array of claim 10 wherein said at least one sensor is combined with said energy transmitting unit to produce a transceiver,
wherein each transceiver is connected by a two-way fiber optic cable to an energy generator and to a computational device for computation of a direction and distance to each object detected.

12. The scanning array of claim 11 which further comprises four or more transceivers attached to said platform and configured to trace one or more scan patterns by transmitting energy and detecting reflected energy.

13. The scanning array of claim 11 in which said energy generator is a laser.

14. The scanning array of claim 13 in which said laser is configured to send laser energy to one or more transceivers, each transceiver of which is configured to send a focused beam of laser energy in said scan pattern, with said transceiver configured for receiving reflected laser energy from each object within said scan pattern when struck by said laser energy.

15. The scanning array of claim 11 in which said transceivers are configured to describe a spiral scan pattern which when combined form a hemispherical shaped scan pattern.

16. The scanning array of claim 8 which further includes one or more gimbal ring motors to impart rocking motions to said first gimbal ring and to said second gimbal ring so that the rocking motions of said first gimbal ring and said second gimbal ring are coordinated to cause nutation of said platform, for creation of said scan pattern.

17. The scanning array of claim 1 in which said scan pattern includes all points on a hemisphere around said scanning array.

18. The scanning array of claim 1 wherein said scan pattern comprises a general detection scan pattern for initially detecting objects, and
wherein the scanning array further comprises a targeting scan pattern for use after an object is detected, said targeting scan pattern configured to pass more frequently over the detected object than said general detection scan pattern.

19. The scanning array of claim 1, wherein said array housing is adapted for mounting said scanning array to a vehicle.

20. The scanning array of claim 1 in which said at least one sensor comprises a light wavelength receiver, for spectral-sensitive detection of light energy emitted from an object encountered in said scan pattern.

21. The scanning array of claim 1 in which said at least one sensor comprises a radar energy receiver, for detection of radar energy from each object encountered in said scan pattern.

22. The scanning array of claim 1 in which said at least one sensor comprises a light detection receiver, for detection of light wavelengths from each object encountered in said scan pattern.

* * * * *

UNITED STATES PATENT AND TRADEMARK OFFICE
CERTIFICATE OF CORRECTION

PATENT NO. : 7,982,662 B2  
APPLICATION NO. : 12/633652  
DATED : July 19, 2011  
INVENTOR(S) : James Shaffer Page 1 of 1

It is certified that error appears in the above-identified patent and that said Letters Patent is hereby corrected as shown below:

Column 2, line 18, delete "personal"
Column 2, lines 53-60, delete "The platform on which ... without rotating"
Column 3, line 23, delete "source"
Column 3, line 33, change "interoperated" to --interpreted--
Column 3, lines 56-57, delete "or the position of a building mounted,"
Column 3, lines 64-67, delete "The device includes ... noted above."
Column 4, lines 22-38, delete "Nutation is defined as: ... definition of the word nutation, a"
Column 4, line 38, change "nutation it may" to --nutation may--
Column 4, lines 40-50, delete "where such nutation is: ... certain forms of this invention. This"
Column 5, line 10, delete "This"
Column 5, line 40, delete "the"
Column 6, line 10, delete "This"
Column 6, lines 44-52, delete all
Column 7, line 52, delete "preferred"
Column 7, line 55, delete "As noted above, the"
Column 8, line 19, delete "or"
Column 11, line 19, delete "grater"
Column 11, line 31, delete "nano"
Column 12, line 62, change "by the a" to --by a--

Column 12, lines 63-64, change "6 a PINFET receivers (depending on how many transceivers are used), 6 and range counters feeding for each" to --a PINFET receiver and range counter for each--

Signed and Sealed this  
Thirtieth Day of August, 2011

David J. Kappos  
*Director of the United States Patent and Trademark Office*